UNITED STATES PATENT OFFICE.

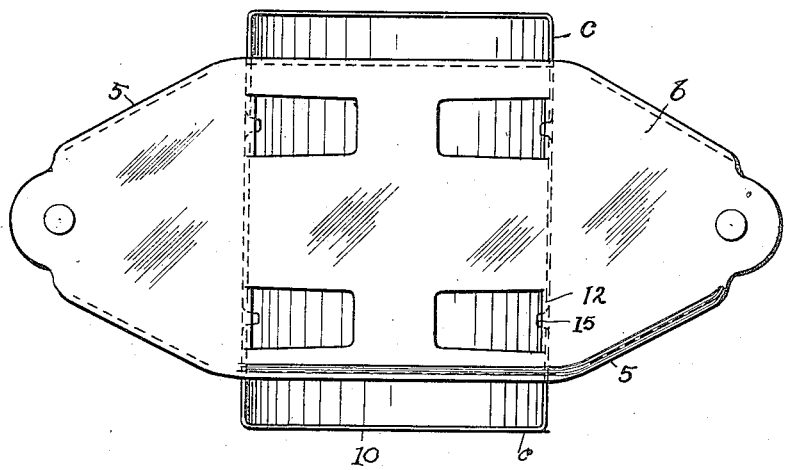
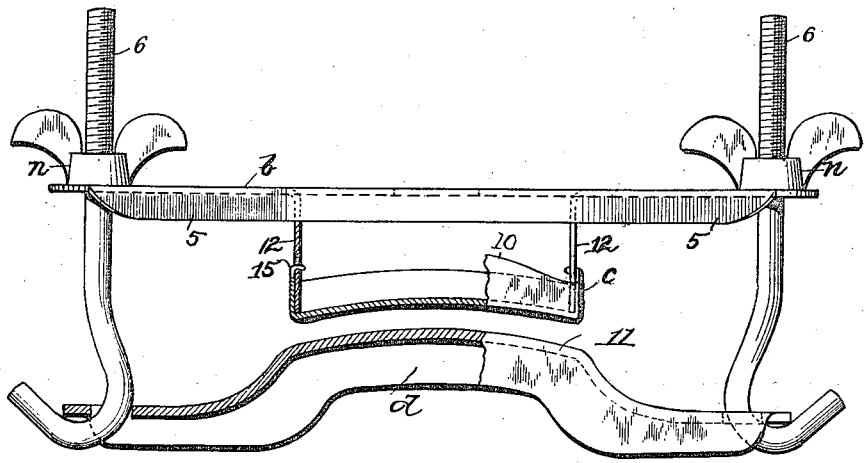

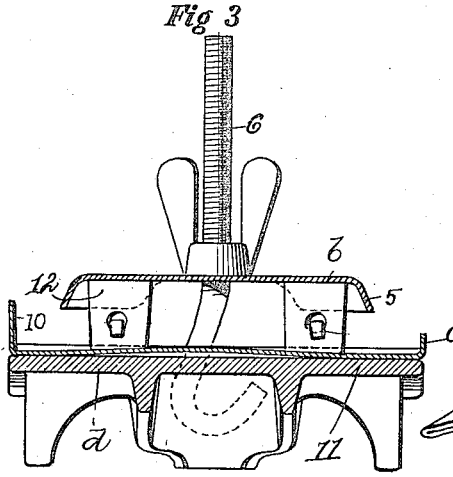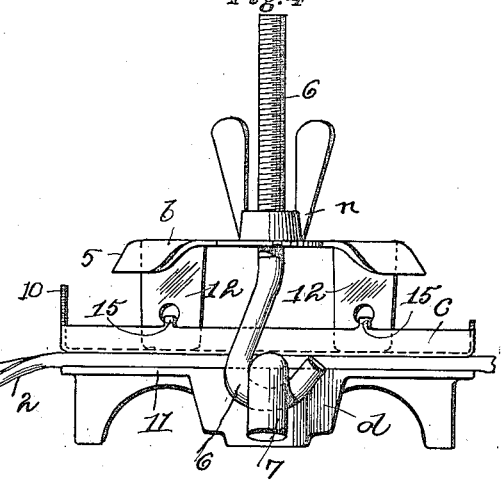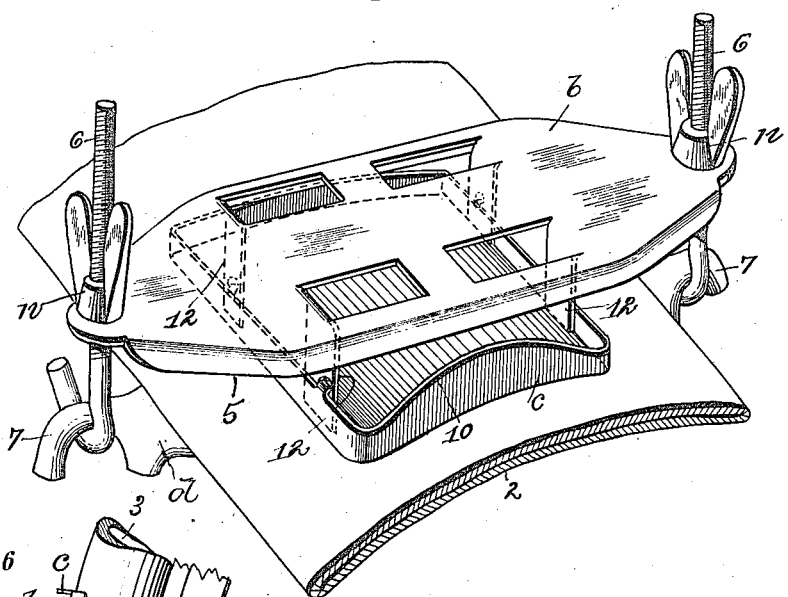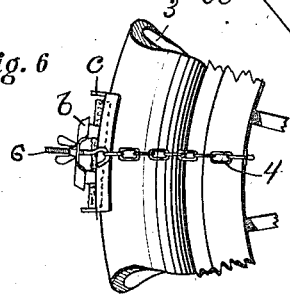

JACOB B. ROSE, OF CLEVELAND, OHIO, ASSIGNOR TO THE MARVEL ACCESSORIES MANUFACTURING COMPANY, OF CLEVELAND, OHIO, A CORPORATION.

VULCANIZER.

1,230,789.  Specification of Letters Patent.  Patented June 19, 1917.

Application filed March 7, 1917. Serial No. 153,075.

*To all whom it may concern:*

Be it known that I, JACOB B. ROSE, citizen of the United States, residing at Cleveland, in the county of Cuyahoga and State of Ohio, have invented certain new and useful Improvements in Vulcanizers, of which the following is a specification.

This invention pertains to a vulcanizer more especially designed for repair purposes and which possesses the new and original construction and adaptation herein shown and described and particularly pointed out in the claims.

In the accompanying drawings, Figure 1 is a plan view of the heating member of the vulcanizer, and Fig. 2 is a side elevation thereof in clamping connection with a base member, a part being in section. Fig. 3 is a transverse section and Fig. 4 an end elevation of the heating member and a cast metal base. Fig. 5 is a perspective view of the structure shown in Fig. 4, showing a rubber tire tube clamped between the parts. Fig. 6 shows a section of a vehicle wheel with the vulcanizer seated in a vertical vulcanizing position upon the tire of the wheel.

As thus shown the vulcanizer or vulcanizing device is adapted to be used effectively for vulcanizing both the inner tubes and the casings of automobile tires, and is especially designed to make repairs wherein fairly large areas are involved and quick results are desirable. To these ends the parts of the device entering directly into the vulcanizing operation may be made of cast or sheet metal but preferably light weight sheet metal pressed into the desired shape and size. The main part of the vulcanizer comprises a practically unitary vulcanizing embodiment consisting of a bridge plate *b* and a heating member *c* rigidly affixed thereto. This part may be used to vulcanize either a tire tube or casing, see Figs. 5 and 6, respectively. In vulcanizing a deflated tube 2 a base member *d* is adapted to be employed, but this base is not necessary in vulcanizing a tire casing 3 mounted on a wheel in an inflated state. In this case a wheel may be engaged about the felly of the wheel as seen in Fig. 6. In a sense, therefore, the device herein is adapted to function with different clamping means according to the work to be done, but in any event the body member *b* and receptacle *c* together constitute the main and essential portion of the device for all work, while the base 2 and chain 4 are alternative.

The bridge or top plate *b* is substantially flat and straight and provided with a stiffening or reinforcing flange 5 about its edge, and has holes through its ends to receive the clamping screws 6 which have hooks or loops at their ends adapted to engage the perforated ends of the base plate *d* in Fig. 2, or the curved projections 7 on the ends of base *d* in Fig. 4, or the end links of chain 4 in Fig. 6. Base *d* has a convex middle portion 11 corresponding to the curvature of the open receptacle *c* comprising the actual heating member, which is adapted to hold a heated metal block, charcoal, live fuel, or any suitable solid combustible or equivalent heating device or medium.

Receptacle *c* has a flange or rim about its edge to confine the heating element or combustible material of whatever kind used and to stiffen said element and one end is supplemented by an extended lip 10 which serves especially to confine the heating element or combustible material when the device is used in a vertical position on a casing 3, as in Fig. 6.

It will be noticed that receptacle *c* and not the plate *b* is clamped directly on the tire, and the said plate *b* and part *c* are rigidly and firmly connected in spaced relation by means of legs or braces 12 struck from the plate *b* and bent downward at right angles thereto in engagement with the bottom and side flanges of receptacle *c* and these flanges have lugs or spurs 15 engaged through holes in said legs to unite the parts together. The intervening space provides ample room for placing the heating element or combustible in the receptacle and prevents radiation of heat from the receptacle to the plate and to afford air for combustion where a combustible is used. In this connection it will also be noticed that receptacle *c* is transverse to the pressure plate *b* and that it extends laterally at both ends beyond the edges of said support and the bottom is concaved to fit a tire casing.

When the device is placed in vulcanizing position the parts are clamped together by tightening the nuts *n* on screws 6, and the parts are readily separated for packing in a small compass and shipping by releasing and withdrawing the screws 6 at their hook ends through the holes in the support and placing the parts *b* and *d* one upon the other.

What I claim is:

1. A vulcanizer comprising a receptacle for a heating device or combustible material and made convex in cross section and flanged about its edge, a support for said receptacle having braces rigidly connecting the receptacle therewith, and clamping screws engaged through the ends of said support.

2. A vulcanizer comprising a flat supporting member and an open receptacle having a vulcanizing bottom, the said support having integral braces struck therefrom and rigidly engaged with the sides of said receptacle, and means to clamp said parts in vulcanizing position upon the work.

3. A vulcanizer comprising an elongated plate having an elongated sheet-metal receptacle rigidly connected in spaced relation therewith and extending beyond the edge thereof at right angles to each other to permit the introduction of a heating element into the receptacle.

4. A vulcanizer comprising a pressure-applying bridge plate and a sheet-metal receptacle secured transversely thereto in spaced relation, said receptacle having an extended end flange projected at right angles to its bottom.

Signed at Cleveland, in the county of Cuyahoga, and State of Ohio, this 20 day of Jan., 1917.

JACOB B. ROSE.